(12) United States Patent
Makhijani et al.

(10) Patent No.: US 7,346,011 B2
(45) Date of Patent: Mar. 18, 2008

(54) SCHEDULING CALLS BASED ON FRAME-OFFSET SELECTION

(75) Inventors: Mahesh Makhijani, San Diego, CA (US); Srinivasan Balasubramanian, San Diego, CA (US); Dang M. Vo, San Diego, CA (US)

(73) Assignee: Telefonaktiebolaget LM Ericsson (publ) (SE)

( * ) Notice: Subject to any disclaimer, the term of this patent is extended or adjusted under 35 U.S.C. 154(b) by 506 days.

(21) Appl. No.: 11/117,012

(22) Filed: Apr. 28, 2005

(65) Prior Publication Data

US 2006/0268827 A1  Nov. 30, 2006

(51) Int. Cl.
*H04B 1/44* (2006.01)
(52) U.S. Cl. ...... 370/280; 370/294; 370/442; 370/478; 370/503
(58) Field of Classification Search .......... 370/280, 370/294, 442, 478, 503, 509, 510
See application file for complete search history.

(56) References Cited

U.S. PATENT DOCUMENTS 6,366,779 B1  4/2002  Bender et al.

2005/0036458 A1  2/2005  Yoon et al.
2006/0245479 A1*  11/2006  Raman et al. ............. 375/150

FOREIGN PATENT DOCUMENTS

WO  03/058829  7/2003

OTHER PUBLICATIONS

Dennett, "The cdma2000 ITU-R RTT Candidate Submission (0.18)," Jul. 27, 1998, pp. 1-311, XP002155233.

* cited by examiner

*Primary Examiner*—Joseph Feild
*Assistant Examiner*—Inder Pal Mehra
(74) *Attorney, Agent, or Firm*—Coats & Bennett, P.L.L.C.

(57) ABSTRACT

A wireless communication network has radio resources for use to support calls over circuit switched (CS) and packet switched (PS) channels. The network uses such radio resources to first support CS calls and thereafter uses the leftover radio resources to support PS calls. The present invention provides method and apparatus that effectively schedule and support incoming CS calls based on frame-offset selection so as to maximize the leftover radio resources that could be used to support PS calls.

26 Claims, 6 Drawing Sheets

SCHEDULING CALLS BASED ON FRAME-OFFSET SELECTION

BACKGROUND OF THE INVENTION

The present invention generally relates to wireless communication networks, and particularly relates to scheduling calls based on frame-offset selection.

The Third Generation Partnership Project 2 (3GPP2), a partnership consisting of five telecommunication standards bodies, establishes Code Division Multiple Access (CDMA) standards for wireless communication networks. There are several established CDMA standards, two of which are IS-95 and IS-2000 or cdma2000. Wireless communication networks operable in accordance with IS-95 or IS-2000 Revisions A and B are capable of supporting (a) calls established over dedicated channels such as fundamental channels and dedicated control channels and (b) calls established over a supplemental channel (hereinafter "SCH"). As used herein, a fundicated channel ("FC") comprises a fundamental channel, a dedicated control channel, or both fundamental and dedicated control channels. Calls established over the FC ("FC calls") are typically, but not necessarily, voice calls, and calls established over the SCH ("SCH calls") are typically data calls having a data rate rarely exceeding 300 kbps. To satisfy the growing demand for high-speed wireless data services at rates beyond 300 kbps, IS-2000 revisions C and D were established and are backward compatible with previous revisions. Revisions C and D are also known as 1xEV-DV, referring to 1 carrier radio transmission technology Evolution for high speed integrated Voice and Data. In accordance therewith, a new channel—a Packet Data Channel (hereinafter "PDCH")—is introduced to support high-speed wireless packet data transmission on the forward link from the network to the mobile station and also on the reverse link from the mobile station to the network. As apparent from its name, the PDCH is a packet switched channel that can be used to support more than one mobile station. More specifically, the PDCH can be shared among a potentially large plurality of packet data users to provide high-speed packet data services to the users sharing such channel.

Because revisions C and D are backward compatible with previous revisions A and B, 1xEV-DV wireless communication networks are capable of supporting (1) traditional voice and data calls established over FCs and SCHs as well as (2) data calls established over a time shared high-speed packet data channel such as the PDCH. In practice, FC calls will have higher priority than SCH calls, which in turn will have higher priority than calls established over the PDCH ("PDCH calls"). Therefore, radio resources such as power and Walsh codes will be given to calls based on the following prioritized order: calls established over the FC; calls established over the SCH and calls established over the PDCH.

cdma2000 networks generally maintain an overall system timing based on 20-millisecond (ms) time intervals and frames. Each 20 ms frame is divided into sixteen power control groups (PCGs) or sixteen 1.25 ms time intervals and the beginning of each PCG or 1.25 ms time interval is known as a frame offset as illustrated in FIG. 1. If there are incoming FC and SCH calls, the network schedules such calls by randomly selecting a frame offset for each incoming FC or SCH call, using such selected frame offset to establish frame timing for communicating with the respective mobile station and also informing the respective mobile station to use the same selected frame offset to establish frame timing for communicating with the network. On the forward radio link, the network transmits traffic frames to the mobile stations associated with FC and SCH calls at various frame offsets as illustrated in FIG. 2. Likewise, such mobile stations also transmit traffic frames to the network at various times on the reverse radio link. Accordingly, the network's call processing load is more evenly distributed within each 20 ms time interval.

This conventional method of synchronizing traffic frames for different users at different frame offsets to achieve a more uniform distribution of call processing load does not necessarily complement all aspects of network operation defined in the newer cdma2000 standards. For example, 1xEV-DV wireless communication networks could also support calls established over the high speed PDCH. To do so, the 1xEV-DV wireless communication network uses radio resources such as power and Walsh codes that are remained or left over after calls established over FC and SCH have been supported since FC and SCH calls are prioritized higher than PDCH calls as discussed above. Such "leftover" radio resources could dynamically change every PCG or every 1.25 ms as existing FC/SCH calls are disconnected from the network or incoming FC/SCH calls are being supported by the network. As a result, the fluctuation associated with leftover radio resources prevent the network from efficiently using such leftover radio resources to better support PDCH calls as further explained below.

FIG. 3 illustrates a graph showing a waveform representing the network's prediction of how its power might be used to support FC and SCH calls starting at $t_0$. Such prediction is necessary for the network to further estimate how much of the leftover power it should use to support PDCH calls on the forward radio link. More specifically, shaded area 2 below the waveform represents power that the network is expecting to be used for supporting FC and SCH calls while the area above the waveform and below $P_{max}$ represents leftover power that could be used to support calls established over PDCH. Assuming the network needs to transmit data from $t_1$ to $t_3$ to a mobile station having an active PDCH call with the network, $(P_{max}-P_1)$ is the maximum leftover power that the network could use to support such transmission even though the estimated leftover power at $t_3$, for example, is greater than $(P_{max}-P_1)$. Thus, one can see areas 4, 6 and 8 that are above the waveform and below the dotted line represent leftover power that could not be used to support any calls because if the network tries to use more power than $(P_{max}-P_1)$ to support the PDCH call such as using $(P_{max}-P_0)$, the network would not have enough power to support FC and SCH calls, which take precedent over PDCH call, especially for example at $t_2$ when $P_1$ will be required to support the FC and SCH calls. Accordingly, current networks fail to efficiently use leftover radio resources to support PDCH calls since some of the leftover power resources cannot be used and thus are wasted.

Likewise, current networks also do not efficiently use leftover Walsh codes resources to support PDCH calls. As FC and SCH calls occupy more Walsh codes with the arrival of incoming calls or abandon Walsh codes as current calls established over such channels are disconnected from the network, the number of leftover Walsh codes that are available to support PDCH calls can change every 1.25 ms or PCG. If there are newly available Walsh codes that could be used to support PDCH calls, the network could not use such newly available Walsh codes for mutli-coding the PDCH because the mobile stations having PDCH calls with the network are not yet aware of such newly available Walsh codes and thus would not be able to demodulate the information sent by the network correctly. To take advantage of such newly available Walsh codes for multi-coding, the network needs to send out a Walsh Mask Broadcast (WMB) message to inform the mobile stations regarding their availability. Sending such WMB message requires 21 bits and thus networks are preferably configured so as to minimize the number of WMB message transmissions to save overhead resources. Regardless, until the network sends out such WMB message, the newly available Walsh codes could not be used.

SUMMARY OF THE INVENTION

The present invention comprises method and apparatus of scheduling and supporting incoming calls to be established over circuit switched (CS) channels such as the FC and SCH based on frame-offset selection so as to maximize the leftover radio resources that could be used to support calls over a packet switched (PS) channel such as the PDCH. More specifically, the present inventions minimizes or eliminates the fluctuation associated with leftover radio resources enabling the network to better plan how it could use as much of the leftover radio resources as possible since such leftover radio resources will be fairly constant over a period of time.

In an exemplary embodiment, a network node selects a subset of at least one frame offset from a set of frame offsets in a repeating frame to support incoming calls over a CS channel. Thereafter the network node assigns a frame offset from the subset to each mobile station associated with an incoming call over the CS channel and uses the assigned frame offset to establish frame timing for communicating with the network. More specifically, the network uses the assigned frame offset to communicate with the mobile stations over the forward CS channel. By transmitting frames to mobile stations associated with the CS calls at the same time or only at certain selected times, the network can better determine the leftover resources that could be used to support calls over the forward PS channel such as the F-PDCH.

BRIEF DESCRIPTION OF THE DRAWINGS

Other objects and features of the present invention and many of the attendant advantages of the present invention will be readily appreciated and become better understood by reference to the detailed description when considered in connection with the accompanying drawings in which like reference numerals designate like parts throughout the figures thereof and wherein.

DETAILED DESCRIPTION OF THE INVENTION

Figure 1:
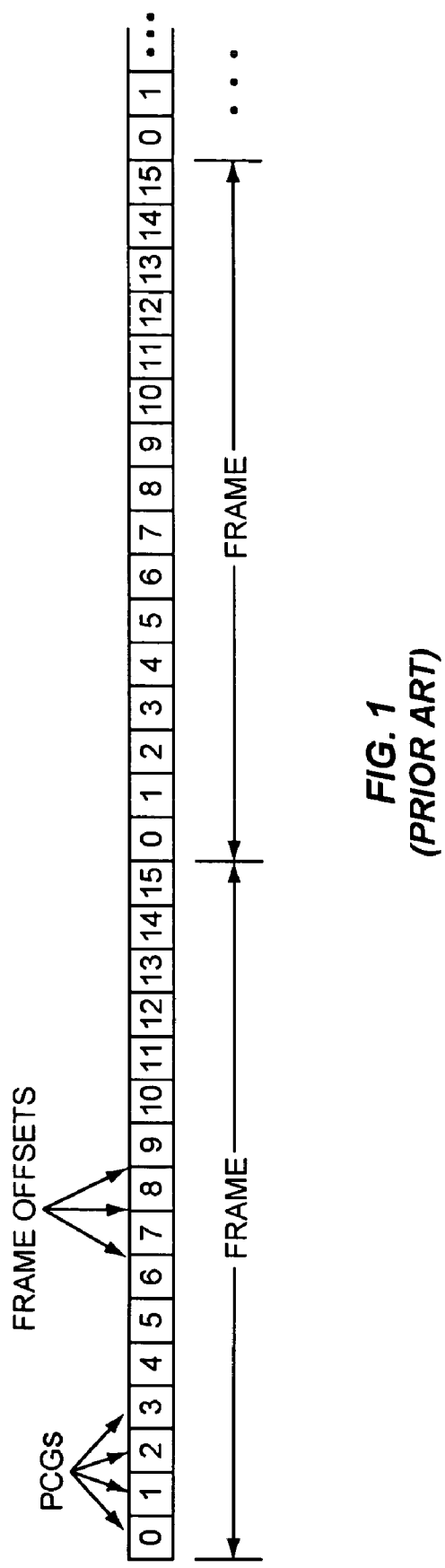
FIG. 1 illustrates repeating frames and the division of each frame into 16 PCGs.
Figure 2:
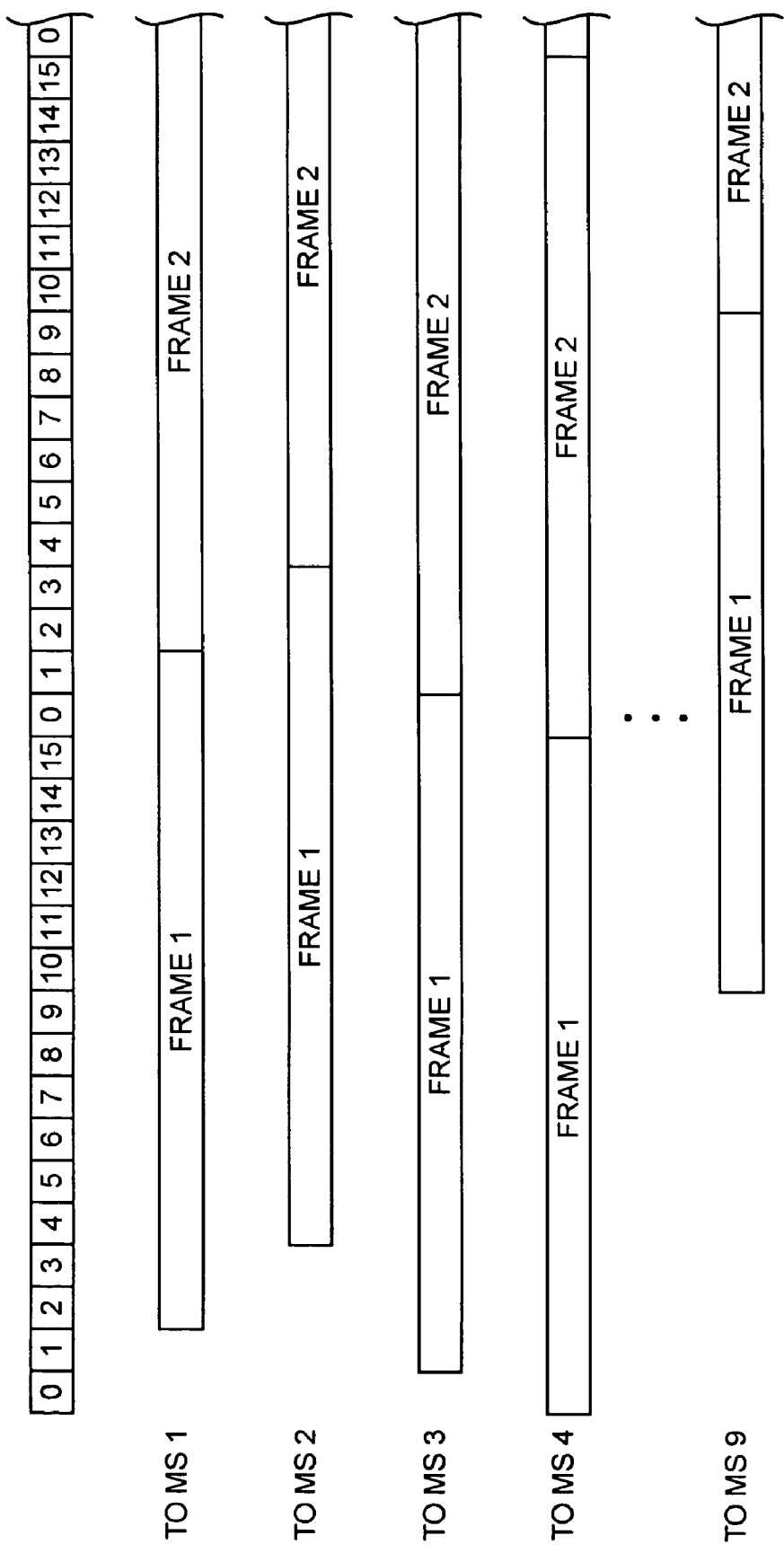
FIG. 2 illustrates frames being transmitted from the network to various mobile stations at different frame offsets randomly selected by the network.
Figure 4:
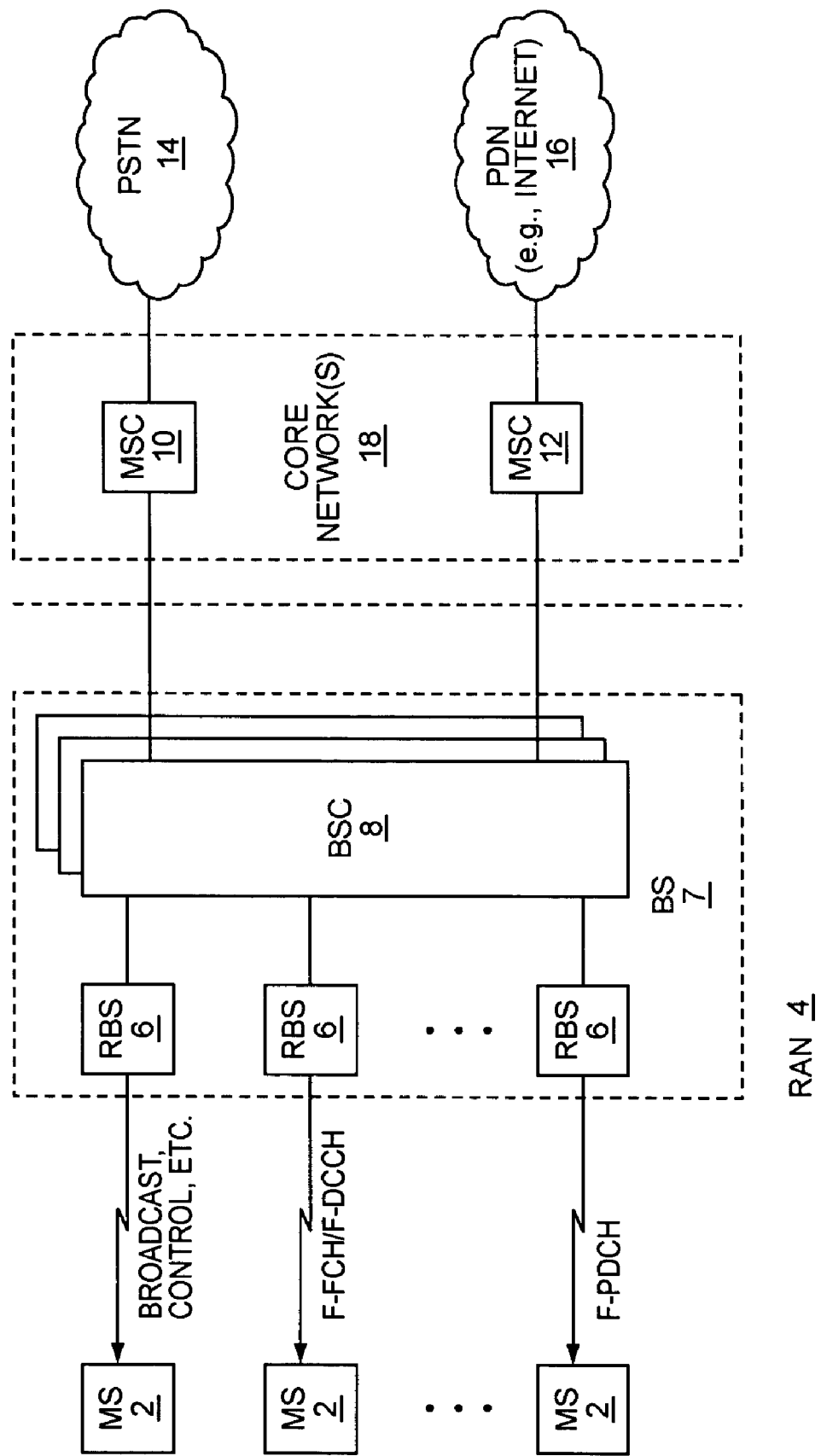
FIG. 4 illustrates a conventional wireless communication network comprising core networks and a radio access network that includes at least one base station to which mobile stations are communicatively coupled.

FIG. 4 illustrates various mobile stations 2 communicatively coupled to a conventional radio access network (RAN) 4 that comprises at least one base station 7 and such base station 7 comprises at least one radio base station (RBS) 6 and one base station controller (BSC) 8. Regarding RBSs 6 that are also may be known as base station transceivers in accordance with 3GPP2, each of them has the necessary circuitry to transmit signals to the mobile stations 2 over the air interface via various forward CS channels such as forward fundamental channel (F-FCH) and forward dedicated control channel (F-DCCH) and forward PS channel(s) such as F-PDCH (s). Regarding the BSC 8, it processes incoming calls from one or more core networks 18 that comprise (i) a mobile switching center (MSC) 10 being communicatively coupled to a public switching telephone network (PSTN) 14 and (ii) a packet data serving node (PDSN) 12 being communicatively coupled to public data network (PDN) 16 such as the Internet. When the BSC 8 receives a call from the core network(s) 18, the BSC 8 processes such call by determining whether the CS or PS channel should be used to support the call. If the incoming call is a CS call, the BSC 8 randomly selects a frame offset to establish frame timing for communicating with the mobile station associated with the incoming call. More specifically, the BSC selects one of the 16 frame offsets in a repeating frame as illustrated by FIG. 1. Such random selection allows the network to transmit traffic frames to mobile stations having CS calls starting at different times and thus eases the network's call processing load since such load is somewhat evenly distributed over any 20 ms time period.

Figure 3:
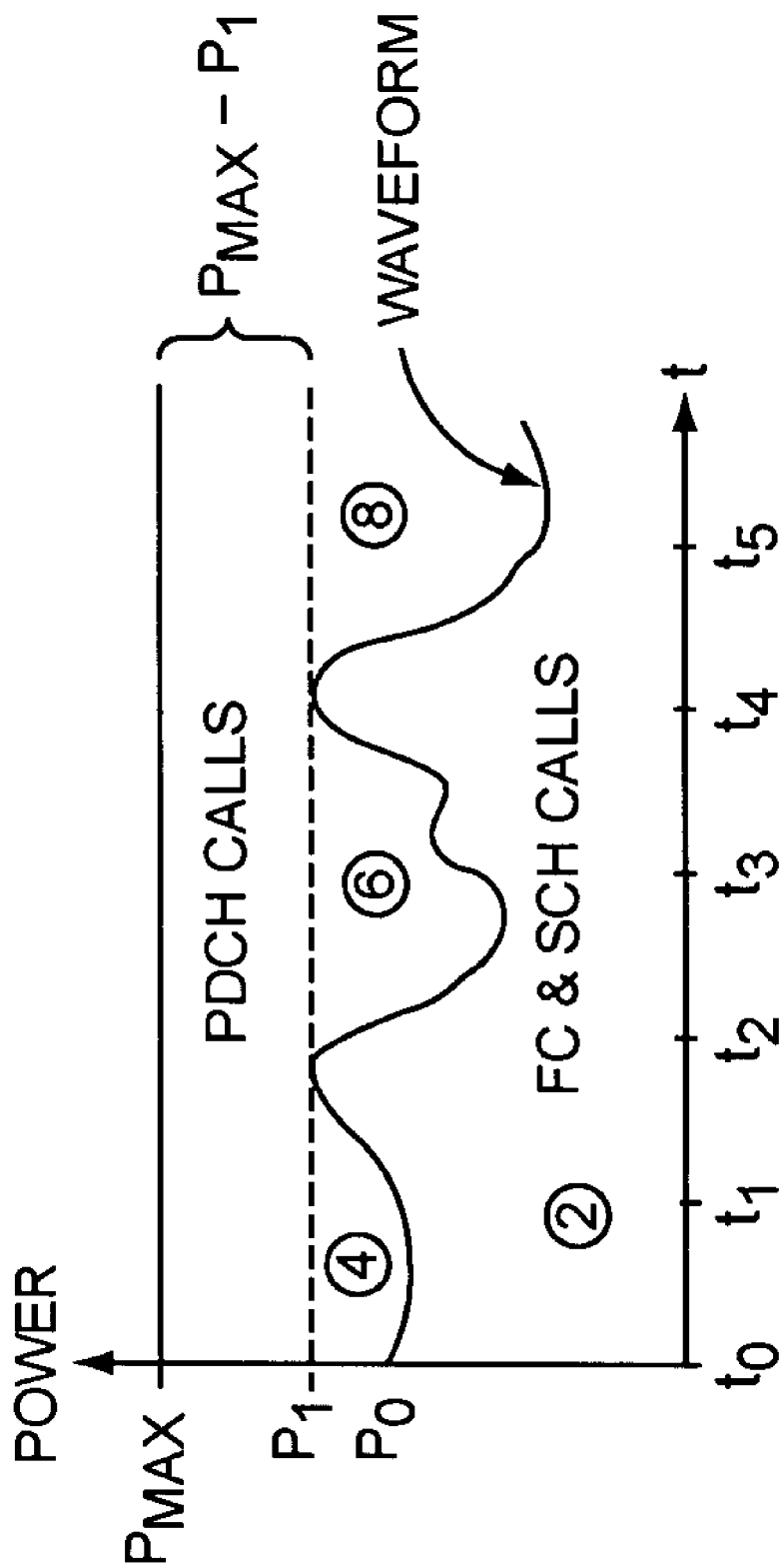
FIG. 3 illustrates a graph of a waveform indicating how the network's power resources can fluctuate with respect to time as new incoming calls get supported by the network and existing calls are disconnected from the network.

As discussed above, such random selection of frame offsets to establish frame timing for the network to communicate with mobile stations associated with CS calls coupled with the arrival and departure of CS calls to and from the network, respectively, causes leftover radio resources to widely fluctuate as shown by FIG. 3 and the network could not use radio resources such as power in those areas 4, 6 and 8 of FIG. 3 since the network must conservatively predict or estimate what the leftover resources will for supporting PDCH calls. The present invention minimizes or substantially eliminates the fluctuation associated with leftover radio resources that could be used to support PDCH calls substantially remain constant over a repeating time interval.

Figure 5:
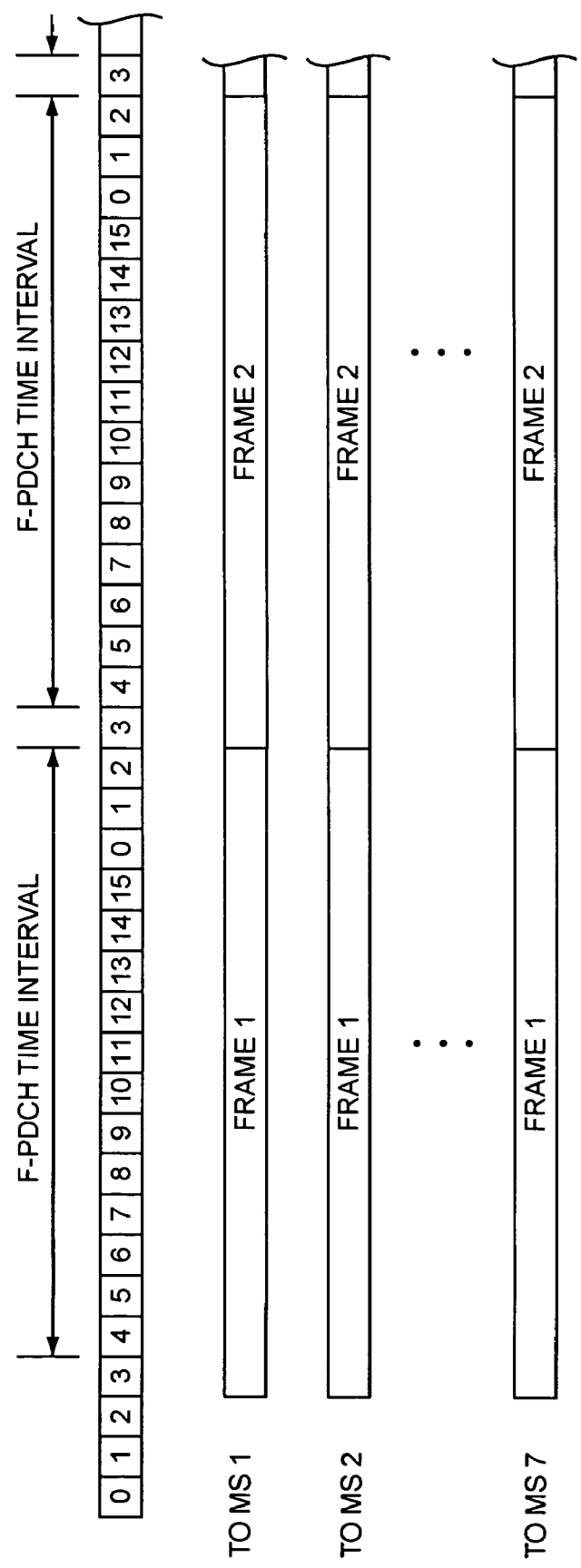
FIG. 5 illustrates frames being transmitted from the network to various mobile stations at a specific frame offset selected by the network.

Referring to FIG. 5, one embodiment of the present invention is explained in conjunction therewith. Instead of randomly selecting a frame offset to support each incoming CS call, the present invention selects a subset of at least one frame offset from a set of 16 frame offsets in a repeating frame. As illustrated by FIG. 5, such subset only includes one frame offset, which is frame offset 3 associated with PCG 3, for this particular embodiment but of course the subset may include 2 or 3 frame offsets. If so, those frame offsets are consecutive frame offsets. For example, the subset may comprise frame offsets 3, 4 and 5.

Once the subset is selected, the network assigns a frame offset from the subset to each CS call and uses the assigned frame offset to establish frame timing for communicating with mobile stations associated with calls over the CS channel. It should be noted that a frame offset or a PCG is associated with a repeating time interval and thus when then network assigns a frame offset such as frame offset 3, the network in effect will use the frame offset 3 in every repeating time interval to establish frame timing for communicating with the mobile stations. FIG. 5 shows that the network uses the frame offset 3 to establish frame timing for communicating with mobile stations (MS) 1-7 associated with CS calls. More specifically, the network begins to transmit traffic frames to mobile stations 1-7 at the same frame offset 3. By transmitting traffic frames to all mobile stations associated with CS calls the same time, the leftover radio resources that could be used to support PDCH calls remain fairly constant during the remaining 15 PCGs ("F-PDCH Time Interval" referenced in FIG. 5) and before the start of the next repeating frame. If there are more incoming calls over the CS channel, the network will continue to use the assigned frame offset or frame offset 3 to establish frame timing for communicating with those mobile stations associated the new CS calls.

In the embodiment where the selected subset has more than one frame offset, the network may use a first frame offset to establish frame timing for communicating with some of the mobile stations, e.g., mobile stations 1-3 and use a second frame offset to establish frame timing for communicating with the remaining mobile stations, e.g., mobile stations 4-7. If there is an incoming call, the network could assign either the first or second frame offset to support such incoming call. Preferably, the network should assign the frame offset at which time the network supports the least number of CS calls.

Once the network allocates its radio resources to support all CS calls, any leftover radio resources could be used to support PS calls. Thus, the network needs to determine the leftover radio resources that are available to support PS calls. Such leftover radio resources comprise power and Walsh codes. Based on their availability, the network can select an appropriate modulation and coding scheme (MCS) for each transmission to a mobile station associated with a PS call.

Regarding power resources, the network estimates the leftover power preferably during the PCG associated with the assigned frame offset such as PCG 3. Such PCG 3 is the time interval right before the F-PCH Time Interval and thus power estimation is ideal at such time because the network should have the latest radio conditions information before it begins to use the estimated leftover resources to support PDCH calls during the F-PDCH Time Interval. At minimum such power estimation should be done during the assigned PCG right before the F-PDCH Time Interval. Preferably power estimation should be done every PCG the initial power estimation because, for example, radio conditions associated with mobile stations supported by the network could change from PCG to PCG and if so, the network will have to adjust its transmission power accordingly.

Figure 6:
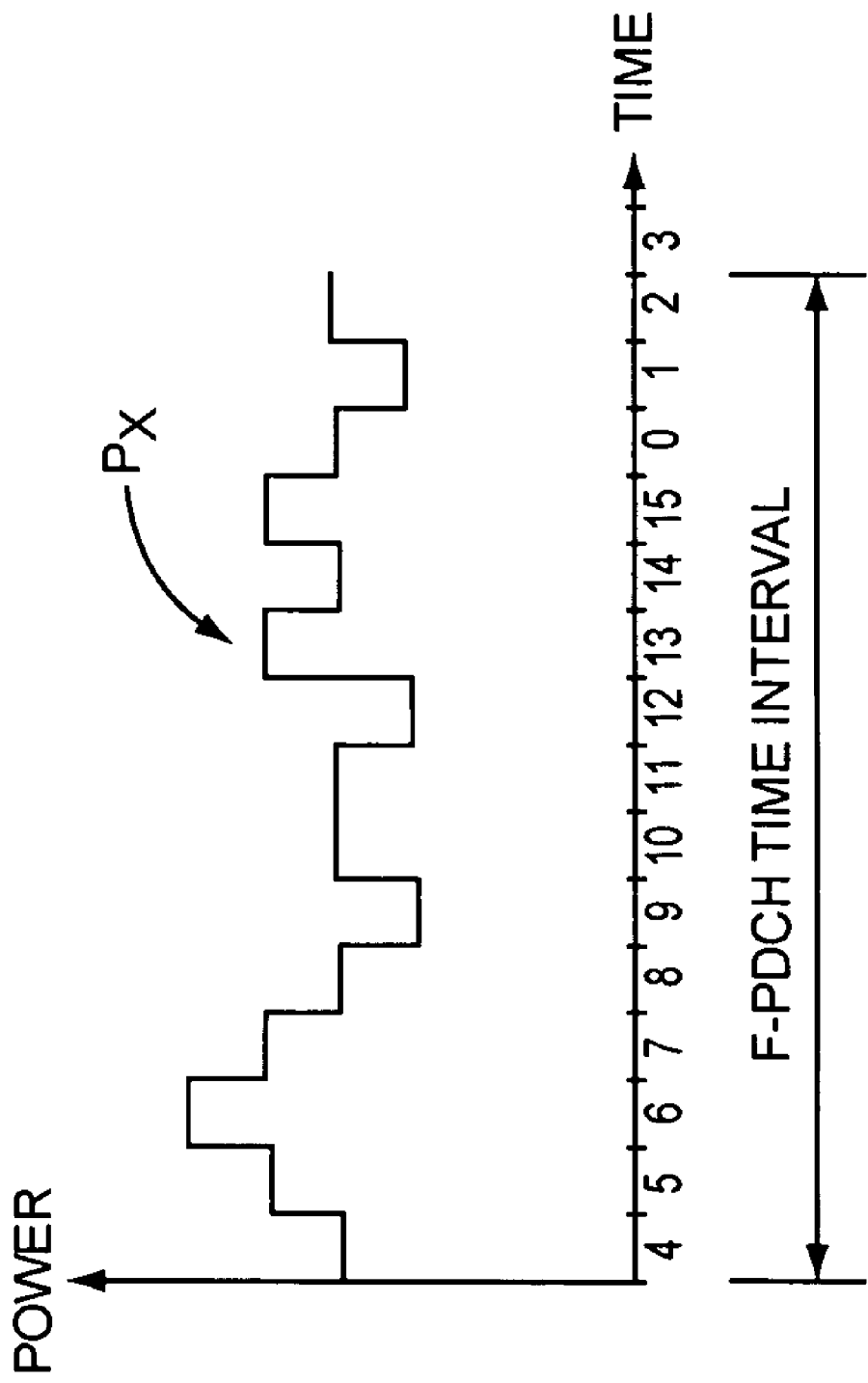
FIG. 6 illustrates a graph of a waveform indicating how the network's power resources can fluctuate for a particular mobile station having a call being supported by network.

FIG. 6 illustrates the network's transmission power fluctuating for 15 PCGs after PCG 3 comprising the assigned frame offset 3. The network's transmission power is higher during PCG 5 than during PCG 4 because, for example, the radio conditions at the network or at the mobile station have worsened. Although the step-size increase or decrease of about 0.25 dB to 1 dB in the network's transmission power is minimal with respect to each mobile station, the fluctuation in network's transmission power is noticeable from PCG to PCG as radio conditions at the network or at all the mobile stations change. Thus, estimating the leftover power that could be used to support PS calls every PCG after the initial power estimation is a desirable.

In addition to estimating the leftover power resources, the network also determines how many Walsh codes are remaining and available to support PS calls. This determination is preferably performed during the same PCG when the leftover power gets estimated, i.e., PCG 3. Once the network knows how many Walsh codes are available to support PS calls, the network sends a Walsh Mask Broadcast (WMB) message to those mobile stations associated with the PS calls regarding the available Walsh codes. The transmission of such message is preferably also occurred during the same PCG 3. The mobile stations need to know what Walsh codes are available so that they can decode packets sent to them from the network, which uses the available Walsh codes to multi-code the forward PS channel such as the F-PDCH for packet data transmissions. Since it requires about 21 bits to send such WMB message, conventional networks infrequently send the WMB message so as to save overhead radio resources. The present inventive network sends it during the PCG associated with the assigned frame offset because during such time interval the network's radio resources are primarily reserved for supporting CS calls and thus the network should make the best use of any leftover radio resources during such time by sending out the WMB message. If there is not enough leftover radio resources to send out the WMB message, the network will try to send it out during the next PCG 3 associated with the repeating frame and so on.

The network also re-determines how many Walsh codes are available approximately every 20 ms after the initial determination. Unlike power estimation, there is no need to do this on a PCG basis since Walsh codes being used to support CS calls are fixed for a given 20 ms time period. If the number of available Walsh codes based on the current determination is different from the number of Walsh codes based on the previous determination, the network will send out another WMB to update the mobile stations. According to the present invention, the network could send a WMB message to the mobile stations associated with PS calls every 20 ms without negatively affecting the network's radio resources.

As discussed above the network uses the assigned frame offset to establish frame timing for communicating with the mobile stations over the forward CS channel. Before the network transmits traffic frames to these mobile stations, the network needs to inform them regarding the assigned frame offset for synchronization purposes. In one embodiment, the mobile stations could just use the assigned frame offset to establish frame timing for communicating with the network over the reverse CS channel. This might yield interference at the network. Alternatively, the network could randomly assign a frame offset for each mobile station to use on the reverse radio link so as to ease such potential interference at the network.

The present invention could be implemented in a network node such as a base station. As used herein with respect to the present invention, the term "base station" comprises a RBS, a BSC or both RBS and BSC. For example, the base station could have circuitry that resides in the RBS, the BSC or both the RBS and BSC. In addition, such circuitry comprises hardware, software or both software and software.

Although particular embodiments of the present invention have been shown and described herein, it will be understood that it is not intended to limit the invention to the preferred embodiments and it will be obvious to those skilled in the art that various changes and modifications may be made without departing from the spirit and scope of the present invention. For example, not only can the present inventive call scheduling scheme be used to enhance 1xEV-DV wireless communication networks but it also can also be used to enhance those wireless communication networks incorporating Wideband CDMA standards, especially since such Wideband CDMA networks also comprise a time shared high-speed packet data channel known as a High Speed Downlink Packet Access (HSDPA) channel. (Note that the HSDPA in more recent literature is sometimes referred to as the "High Speed Downlink Shared Channel" or HS-DSCH.) Thus, the invention is intended to cover alternatives, modifications and equivalents, which may be included within the spirit and scope of the invention as defined by the following claims and their legal equivalents.

What is claimed is:

1. A method of scheduling incoming calls in a wireless communication network configured to support calls established over circuit switched (CS) and packet switched (PS) channels, comprising:
   selecting a subset of at least one frame offset from a set of frame offsets in a repeating time interval to support incoming calls over a CS channel; and
   assigning a frame offset from the subset to mobile stations associated with an incoming call over the CS channel, wherein the network uses the assigned frame offsets to establish frame timing for communicating with the mobile stations associated with the calls over the CS channel.

2. The method of claim 1 further comprising:
   informing a mobile station associated with a subsequent incoming call over the CS channel regarding the assignment.

3. The method of claim 1, wherein assigning comprises assigning a first frame offset from the subset to some of the mobile stations and a second frame offset from the subset to some of the mobile stations, said first and second frame offsets being consecutive frame offsets, and further wherein the network uses the assigned first and second frame offsets to establish frame timing for communicating with the mobile stations.

4. The method of claim 1 further comprising:
   in each repeating frame time period, determining radio resources that could be used to support calls over a PS channel, wherein the determination is performed during a power control group (PCG) associated with the assigned frame offset.

5. The method of claim 4, wherein determining radio resources further comprises estimating how much power is available to support calls over the PS channel.

6. The method of claim 5, wherein the radio resources indicate which Walsh codes are available to support calls over the PS channel and further comprising:
   sending a Walsh Mask Broadcast (WMB) message to mobile stations having calls over the PS channel, wherein the WMB message is sent during a PCG associated with the assigned frame offset and if there are available radio resources to send the WMB message.

7. The method of claim 6 further comprising:
   a sending another WMB message if a number of Walsh codes available to support calls over the PS channel based on a current determination is different from the number of Walsh codes based on a previous determination.

8. The method of claim 6 further comprising:
   selecting a modulation and coding scheme (MCS) for each transmission to a mobile station having a call established over the PS channel with the network, wherein the selection is based on available power and Walsh codes.

9. The method of claim 4 further comprising:
   re-determining the radio resources during every PCG after initial determination.

10. The method of claim 1 further comprising:
    using the assigned frame offset to communicate with the mobile stations over forward and reverse CS channels.

11. The method of claim 1, wherein the mobile stations use the assigned frame offset to communicate with the network over a forward CS channel and further comprising:
    randomly assigning a frame offset from the sub set for each mobile station to use for communicating with the network over a reverse CS channel.

12. A base station for scheduling incoming calls in a wireless communication network configured to support calls established over circuit switched (CS) and packet switched (PS) channels, said base station comprising circuitry configured to:
    select a subset of at least one frame offset from a set of frame offsets in a repeating time interval to support incoming calls over a CS channel; and
    assign a frame offset from the subset to each mobile station associated with an incoming call over the CS channel, wherein the network uses the assigned frame offset to establish frame timing for communicating with mobile stations associated with the calls over the CS channel.

13. The base station of claim 12, wherein the circuitry is further configured to:
    inform a mobile station associated with a subsequent incoming call over the CS channel regarding the assignment.

14. The base station of claim 12, wherein the circuitry is further configured to assign a first frame offset from the subset to some of the mobile stations and a second frame offset from the subset to some of the mobile stations, said first and second frame offsets being consecutive frame offsets, and further wherein the circuitry is configured to use the assigned first and second frame offsets to establish frame timing for communicating with the respective mobile stations.

15. The base station of claim 12, wherein the circuitry is further configured to:
    in each repeating frame time period, determine radio resources that could be used to support calls over a PS channel, wherein the determination is performed during a power control group (PCG) associated with the assigned frame offset.

16. The base station of claim 15, wherein determining radio resources further comprises estimating how much power is available to support calls over the PS channel.

17. The base station of claim 16, wherein the radio resources indicate which Walsh codes are available to support calls established over the PS channel and further wherein the circuitry is further configured to:
    send a Walsh Mask Broadcast (WMB) message to mobile stations having calls over the PS channel, wherein the WMB message is sent during a PCG associated with the assigned frame offset and if there are available radio resources to send the WMB message.

18. The base station of claim 17, wherein the circuitry is further configured to:
    send another WMB message if a number of Walsh codes available to support calls over the PS channel based on a current determination is different from the number of Walsh codes based on a previous determination.

19. The base station of claim 17, wherein the circuitry is further configured to:
  select a modulation and coding scheme (MCS) for each transmission to a mobile station having a call established over the PS channel with the network, wherein the selection is based on available power and Walsh codes.

20. The base station of claim 12, wherein the circuitry is further configured to:
  use the assigned frame offset to communicate with the mobile stations over forward and reverse CS channels.

21. The base station of claim 12, wherein the mobile stations use the assigned frame offset to communicate with the network over a forward CS channel and further comprising:
  randomly assigning a frame offset from the set for each mobile station to use for communicating with the network over a reverse CS channel.

22. A method of scheduling incoming calls in a wireless communication network configured to support calls established over circuit switched (CS) and packet switched (PS) channels, comprising:
  reserving a time interval in a repeating time interval to begin transmitting frames to mobile stations associated with incoming calls over a CS channel, said time interval comprising at least one Power Control Group (PCG); and
  scheduling the incoming CS calls by using a frame offset of a PCG in the time interval to establish frame timing for communicating with the mobile stations.

23. The method of claim 22 further comprising:
  assigning the frame offset to each mobile station associated with an incoming CS call, wherein the network uses the assigned frame offset to establish frame timing for communicating with the mobile stations.

24. The method of claim 22 further comprising:
  in each repeating frame time period, determining radio resources that could be used to support calls over a PS channel, wherein the determination is performed during the PCG associated with the assigned frame offset.

25. The method of claim 24, wherein determining radio resources further comprises estimating how much power is available to support calls over the PS channel.

26. The method of claim 25, wherein the radio resources indicate which Walsh codes are available to support calls over the PS channel and further comprising:
  sending a Walsh Mask Broadcast (WMB) message to mobile stations having calls over the PS channel, wherein the WMB message is sent during PCG associated with the assigned frame offset and if there are available radio resources to send the WMB message.

* * * * *

UNITED STATES PATENT AND TRADEMARK OFFICE
CERTIFICATE OF CORRECTION

PATENT NO. : 7,346,011 B2
APPLICATION NO. : 11/117012
DATED : March 18, 2008
INVENTOR(S) : Makhijani et al.

It is certified that error appears in the above-identified patent and that said Letters Patent is hereby corrected as shown below:

In Column 2, Line 64, delete "mutli-coding" and insert -- multi-coding --, therefor.

In Column 7, Line 42, in Claim 4, delete "offset." and insert -- offsets. --, therefor.

Signed and Sealed this

Fourteenth Day of October, 2008

JON W. DUDAS
*Director of the United States Patent and Trademark Office*